US011299030B2

(12) United States Patent
Huang

(10) Patent No.: US 11,299,030 B2
(45) Date of Patent: Apr. 12, 2022

(54) SMART MOBILE VEHICLE

(71) Applicant: Hsueh Cheng Huang, Taipei (TW)

(72) Inventor: Hsueh Cheng Huang, Taipei (TW)

( * ) Notice: Subject to any disclaimer, the term of this patent is extended or adjusted under 35 U.S.C. 154(b) by 363 days.

(21) Appl. No.: 16/529,817

(22) Filed: Aug. 2, 2019

(65) Prior Publication Data

US 2020/0039597 A1 Feb. 6, 2020

Related U.S. Application Data

(60) Provisional application No. 62/714,294, filed on Aug. 3, 2018.

(51) Int. Cl.

| | |
|---|---|
| *B60K 7/00* | (2006.01) |
| *B62K 11/00* | (2006.01) |
| *B62L 3/04* | (2006.01) |
| *B60B 19/00* | (2006.01) |
| *B62K 25/04* | (2006.01) |
| *B62J 43/16* | (2020.01) |
| *B62J 43/20* | (2020.01) |
| *B60F 3/00* | (2006.01) |
| *B60G 11/27* | (2006.01) |
| *B60G 11/26* | (2006.01) |

(Continued)

(52) U.S. Cl.
CPC .............. *B60K 7/0007* (2013.01); *B62J 43/16* (2020.02); *B62J 43/20* (2020.02); *B62K 11/007* (2016.11); *B62K 25/04* (2013.01); *B62L 3/04* (2013.01); *B60B 19/00* (2013.01); *B60B 2360/10* (2013.01); *B60B 2360/3416* (2013.01); *B60B 2360/90* (2013.01); *B60F 3/0084* (2013.01); *B60G 11/265* (2013.01); *B60G 11/27* (2013.01); *B60K 17/043* (2013.01); *B60T 8/1701* (2013.01); *B60T 2270/10* (2013.01); *B62K 2202/00* (2013.01)

(58) Field of Classification Search
CPC ......... B62K 11/007; B62L 3/04; B60B 19/00; B60K 7/0007; B60K 17/043
See application file for complete search history.

(56) References Cited

U.S. PATENT DOCUMENTS

| | | | | | |
|---|---|---|---|---|---|
| 4,541,643 | A | * | 9/1985 | Pavincic | A63C 17/004 280/11.201 |
| 7,303,032 | B2 | * | 12/2007 | Kahlert | B62D 61/00 180/21 |

(Continued)

*Primary Examiner* — Tony H Winner
*Assistant Examiner* — Michael R Stabley
(74) *Attorney, Agent, or Firm* — Leong C. Lei

(57) ABSTRACT

The present invention provides a smart mobile vehicle comprising a vehicle body, a chassis, driving wheels, a battery module, a plurality of motors and a vehicle control unit. The chassis has a suspension system, a brake system and a steering system. The two driving wheels are composed of a plurality of circular units, and the driving wheels are embedded in two-wheel frames on two sides of the vehicle body. The battery module provides the smart mobile vehicle with driving power. The plurality of motors disposed between the two circular units or on a surface of any one of the circular units; wherein the motors are electrically connected to the battery module, and the torque and directional outputs of the motors is used to drive the rotation of the two driving wheels. The vehicle control unit is electrically connected to the motors and the battery module to transmit a monitoring signal.

10 Claims, 12 Drawing Sheets

(51) Int. Cl.
*B60K 17/04* (2006.01)
*B60T 8/17* (2006.01)

(56) References Cited

U.S. PATENT DOCUMENTS

| | | | | |
|---|---|---|---|---|
| 7,958,961 | B1 * | 6/2011 | Schade | B62K 11/007 180/273 |
| 8,424,628 | B1 * | 4/2013 | Schade | B60L 15/2036 180/273 |
| 8,562,387 | B1 * | 10/2013 | Henthorne | A63H 17/262 446/431 |
| 8,684,123 | B2 * | 4/2014 | Chen | B62K 11/007 180/218 |
| 8,807,250 | B2 * | 8/2014 | Chen | B62K 11/007 180/21 |
| 9,010,474 | B2 * | 4/2015 | Martinelli | B62K 11/007 180/218 |
| 9,499,228 | B2 * | 11/2016 | Chang | B62K 5/01 |
| 9,604,692 | B1 * | 3/2017 | Kim | B62D 11/02 |
| 9,694,846 | B2 * | 7/2017 | Lan | G01G 7/02 |
| 9,745,013 | B2 * | 8/2017 | Wood | G01G 19/12 |
| 9,764,218 | B2 * | 9/2017 | Treadway | A63C 17/0046 |
| 9,937,973 | B2 * | 4/2018 | Chen | B60L 3/0023 |
| 10,167,038 | B2 * | 1/2019 | Kim | B62K 11/007 |
| 10,737,739 | B2 * | 8/2020 | Martinelli | B62K 11/14 |
| 10,870,359 | B2 * | 12/2020 | Chen | B62K 11/007 |
| 2018/0148120 | A1 * | 5/2018 | Yang | B62K 1/00 |
| 2018/0154972 | A1 * | 6/2018 | Chen | B62M 7/12 |
| 2018/0334214 | A1 * | 11/2018 | Cuban | B62J 15/02 |

\* cited by examiner

SMART MOBILE VEHICLE

(A) TECHNICAL FIELD OF THE INVENTION

The present invention relates to a smart mobile vehicle, and more particularly to use a novel smart mobile vehicle with its integration in vehicle design, manufacturing, network connectivity, amphibian capability, and business models to act as a novel solution for preceding problems in event of global warming as well as a realistic social approach for the realization of electricity economy.

(B) DESCRIPTION OF THE PRIOR ART

Global warming by carbon emission is a humanity survival problem, that affects not only an individual's health also compromise future genre's quality of living and productivity. It impacts on taxation stability and compromise future sustainability at all levels. Transportation services and automotive manufacturing supply chains are account for majority of carbon emission, but also represent key incomes that generate most regional's revenue and taxes.

Conventional automotive vehicles were designed on the old principal when energy and land in abundance, driver's experiences and individual's ego are priority which are translated to the success and sales of a vehicle. Prior global warming's costs and a global concern, it makes perfect sense to centralize automotive manufacturing, when Henry Ford starts his T1 production line, the purpose was to lowering the cost, increase production uniformity, and given workers a quality working theme as well as capital efficiency for investors. As vehicle traveling speed increases, centralized manufacturing methodology becomes the key reason for vehicle's safety and integrity, as the result controlled vehicle styles and limit functionalities starts to take market shares as sales grows (a chassis/assembly plant for a style/function). Enhancement in advanced materials and components brings vehicle capabilities to provide higher torque to cope the high way and urban speeds, this drives design and production further into the scope of egocentric-economy instead of serving society's diversity needs at minimum resources that costs our future to build with. When centralized manufacturing is a compulsory rule to mass GDP, owns sizable capital/land resources at its dispose, sometimes it becomes a monster/cancer for its societies/economy to bear, with price reduction to export, local and off-shore societies are forced to digest inappropriate vehicles simply to maintain its living needs. As time and population grows, international conflicts arises, resources scarce, local/regional protectionism becomes a common phenomenon, that turns the four necessity (air, sun, water, transportation) into a global social chaos which may leads to the dooms of humanity.

Furthermore, large efforts and investments have been injected into the research and applications for electric autonomous vehicles, to realizing these, common values on vehicle integrities, regulations, energy sources and third party liabilities in security, insurance, finance technology, moralities in machine decisions all in need to be addressed, these means our future vehicles will no longer be a "transportation" vehicle, it should be an multiplex functional mobile platform that reflects the true needs of our daily life, with adaptation in the form of nature's wisdom and connectivity.

In summary, automotive industries and services it provides are the greatest source of carbon emission, disregards the styles, or the design or the business model of electric vehicles today, it does not fully meet the needs of the consumers nor is generating sufficient revenue to justify its cost, or built a future with our society while encourage sustainability in daily operation.

So, if a design can based on electricity economy by using nature's circle shape to protect the passenger, and multiplex nature to act as multi-functional all-weather platform for services, and logistics, eco-friendly distributive manufacturing process by design to encourage local assemblies for prosperity and circular economy in human resources for sustainability, onboard communication networks will link all elements in the region as well as interacting globally through its game and content, this will propel into a better future with value sharing and further realized by WYSIWYB (where you see is where you be).

We should use prior art as landscape of opportunity that act as fulcrum to encourage the transformation of the traditional automotive world. If we wish to resolve global warming and related crisis effectively, the issue is far beyond the removal of fossil fuel and air pollutant from the air, we need a new system by design that gives sufficient incentive to attract practical participant to build values in the system. Road will no longer only being the pipe that links from A to B, we should see multiplex vehicles are a kind of stein cells and roads are veins through the cities, and connectivity are in reflection of human's nerve/neuro systems. So, we remove/in-bring materials effectively while having ability to defend itself from a LEGO-alike elementary flexibility and efficiency. Roads were paid by public tax, time we spent on it should be convert into values that returns to the society who pays for it, and furthermore to fulfill the activity needs from home to road, from countryside to factory grounds, or experiencing things that current vehicle cannot. We can only achieve so by encourage each individual around the world to participate and turning old ego-centric-economy of humanity from "Marketing+Trade=>delivery" into newer eco-circular-economy "Marketing(Communicating)+Trade(globally)=>Experiencing(participating)".

SUMMARY OF THE INVENTION

In view of the safety and functionality of electric vehicle in presently technical drawbacks, the main purpose of the present invention is to provide a smart mobile vehicle having the characteristics of a separate-able design of the vehicle cabin, and the chassis. Further, the circular wheels having two standing large diameter wheels and a circular/enclosed tubular chassis, and an inflatable tire attached to the chassis and cabin base that can form a complete damping plane with motion. The present invention can achieve the purpose of increasing safety on impact, buoyancy in water and vibration reduction on the road, considering dual large circular shape wheel assembly provides greater impact resistance and can be easily serviced without a perfect working horizontal.

To achieve the above object, the present invention provides a smart mobile vehicle comprising a vehicle cabin/body, a chassis with multiple forms of suspensions, a rocker/leveling machine, two driving wheels, at least one battery module, a plurality of motors, a collective of sensors, a collective of radio antennas, a vehicle control unit, and assembly of user interfaces with monitors of audio, video, motion or other forms of human communicative gadgets. First, the vehicle body has an accommodation space. Secondly, the chassis is asymmetrical assembled chassis locate at the bottom of the vehicle, and the chassis has at least a set suspension system, a brake system, a drive system and a steering system, wherein the suspension system is connected to the vehicle body. Further, the two driving wheels are composed of a plurality of circular units as propel units to the road of the drive system, each of the circular units is composed of a plurality of plastic, metal, wood or carbon fiber, and the two driving wheels are embedded in two-wheel frames on two sides of the vehicle body; wherein the two-wheel frames are connected to a chassis frame by inserts, pins, level arms, pushrods or at least two fasteners, the steering of the two driving wheels is controlled by a rocker module and the vehicle control unit connected steering system, the two driving wheels respectively have a plurality of circular members, and the circular members fixed in the tail groove form by a fixing structure and a positioning member, by inserts, pins, or at least one fasteners. Furthermore, the battery module provides the smart mobile vehicle with driving power. In addition, the plurality of motors disposed between the two circular units or on a surface of any one of the circular units; wherein the motors are electrically connected to the battery module. Finally, the vehicle control unit is electrically connected to the motors, a collective of sensors, a rocker/leveling machine, a steering system, a collective of radio systems, and the battery module to transmit a monitoring and controlling signals by translating user systems decisions with input of all systems signals, using torque, speed of drive wheels/motor (RPM-round per minute), and directional outputs of the motors to drive the speed, rotation, stability or brakes of the two driving wheels.

In the smart mobile vehicle of the present invention, the suspension system has at least an fluid/air inflate balloon/bag/ring, at least one actuator suspension (electrical or hydraulic), at least one sort of spring to capable of shock absorption, and or one gear transmission system; wherein the gear transmission can also be assembled with clutch in dual/triple differential steering system or Continuously Variable Transmission (CVT), Anti-Brake System (ABS) to act as secondary brake or torque balance in transmission. Furthermore, inflate tire for suspension can also be assembled with a ring combination by magnetic, elastic, electromagnetic or gravity, flywheel energy generation or storage structural systems.

In the smart mobile vehicle of the present invention, the smart mobile vehicle further comprises a level and distance detection sensor connected to the vehicle control unit, a distance between the vehicle cabin body, chassis and the ground is obtained by optically reflecting through a light sensor, and transmits the distance to the vehicle control unit. The level and distance sensor could be based on optical images, infrared sensors sonar sensors, or any sort of distance detect mechanism with signal. A level sensor, gravity accelerator or a gyroscope to obtain a level, rotational value, and gravity of the smart mobile vehicle, and the level value is transmitted to the vehicle control unit.

In the smart mobile vehicle of the present invention, the smart mobile vehicle further comprises at least one outer cover that is movably disposed on the two-wheel frame, the outer cover is an outer tapered structure or a O-shaped or V-shaped structure; and the magnetic components used for electricity or signal generation are embedded in the two-wheel frames.

In the smart mobile vehicle of the present invention, the collective of antenna system is comprises antennas of at least a GNSS/GPS, at least a WIFI, at least a radio, at least a microwave, at least a Bluetooth, and at least a Zigbee. These antennas are electrically connected to router that connect and distribute signals to vehicle control unit and game/entertainment/information control unit. This antenna systems acts as receiver/transponder provides a assembly of channels that connect inside networks, outside networks, edge microprocessor unit and inter-vehicle communications, which too forms varieties of networking or independent network mesh as desired.

In the smart mobile vehicle of the present invention, the steering system further comprises a plurality of gearboxes connected to the motors, one of the gearboxes has an acceleration or deceleration machine; wherein the two drive wheels generate a differential speed through the acceleration or deceleration machine to turn the smart mobile vehicle or utilize its momentum to generate electricity through these machine.

In the smart mobile vehicle of the present invention, the brake system includes at least an electronic controlled brake function and/or a physical brake pedal, at least a brake disc in each wheel, at least a brake clamp in each wheel, at least a anti brake system with each wheel, at least an optical sensor and a pressure sensor, when the brake signal is given or pedal stepped, the smart mobile vehicle is braked to drive the brake system to decelerate the two driving wheels as primary speed reducer, the vehicle control unit is connected to the pressure sensor to receive a pressure by the pressure sensor to converted into the monitoring signal, the vehicle control unit is connected to a light gate sensor to receive the round per minute count by the optical sensor to converted into the monitoring signal and transmitted to a brake caliper to brake a large wheel disc by clamp, drum or ABS; or a drive shaft in a gearbox or a clutch attached on the shaft to decelerated to brake.

In the smart mobile vehicle of the present invention, the smart mobile vehicle further comprises a weight sensor system connected to the vehicle control unit, act as vehicle stability and control instrument that the vehicle control unit is to receive a pressure signal into monitoring signal, to allow vehicle control unit to obtain the dynamic of weight to speed, inertia directional, momentum, vehicle loading values of the smart mobile vehicle cabin, and furthermore the distributive values are transmitted to the vehicle control unit to fine-tune the output of two drive wheels and ensure dual reverse pendulum balance are maintained throughout the travel.

In the smart mobile vehicle of the present invention, the smart mobile vehicle further comprises a bevel wheel having a pulley structure, and the bevel wheel can support the smart mobile vehicle when the smart mobile vehicle is overturned; or according to the surrounding environment of the smart mobile vehicle, the pulley structure provides ability to manipulate the center of gravity or a vertical height of a cabin by gears to suit position or operation. The smart mobile vehicle can travel on the rough water when the center of gravity of the vertical height to the cabin is adjusted to be lower than the water surface, or lift the cabin to higher position for better views or vehicle maneuver; and the smart mobile vehicle can travel on the road or still water when the center of gravity or vertical height of the cabin is in the general position. At the same time, the center damping tire in the chassis can also correct the relative air volume or density of the vehicle to adjust the degree of ups and downs in the water or comfort.

In the smart mobile vehicle of the present invention, the smart mobile vehicle further comprises a control unit disposed in the vehicle control unit, when the smart mobile vehicle turns, the weight distribution of the smart mobile vehicle is calculated by the control unit based on a spring coefficient of a shock absorber and a hardness control of the two driving wheels; when the smart mobile vehicle turns, a centripetal force and a reverse centripetal force are generated; and when a roll center of the centripetal force exceeds the relationship between the center of gravity of the two driving wheels and the smart mobile vehicle, the control unit performs a stability correction of the smart mobile vehicle.

In the smart mobile vehicle of the present invention, the skeleton of the cabin structure can be constructed by sheet or tubular structures of wood, bamboo, composite, metal or foam, in the shape of connected polygon or circles to act as superstructure cage to protect its cargo, furthermore these skeletons must have at least one diagonally cross factor from two far ends of the chamber to form a rigid frame. In-betweens of the structure can also be set up as emergency exits, windows, virtual reality hanger, 360 degrees rotation gadget or spaces for other gadgets or hardware for vehicles/network applications.

In the smart mobile vehicle of the present invention, the exterior structure of the cabin can be shaped by the material that carries characters of toughness, pores, hydrophobicity with appropriate watertight close cabin design smart mobile vehicle can traverse in the water as a afloat basin. Exterior structures can also bond with electrically trigger lamination, displays, signages or mechanisms to form the vehicle shape and color as well as communication functions, furthermore the utilizing of cabin's concave/convex exterior shapes with optical lens and solar generators, Chlorophyll and bio-gas generation systems can generate power or cleanse air by vehicle control unit and game/entertainment/information system's desire.

In the smart mobile vehicle of the present invention, the floor structure of the cabin can be shaped by the material toughness and can be lifted and pulled. The outer frame or floor of the cabin can be controlled to produce vertical and horizontal swift or rock motion by its suspension systems or can also be connected by external shock absorbers or pushrods. In addition, accessories are controlled by the putter as a board platform for unlimited motion of virtual reality game room.

In the smart mobile vehicle of the present invention, the chassis structure can be connected in series and can be connected in parallel via tow bars, C-couplings. One or more gravity/flywheel energy storage system can be add in the center of the smart mobile vehicle to use its vertical rotation centripetal forces to function the stand and stability of the two-wheeler, and act as alternative power in/output storages by gyroscopic ability of energy generation.

The smart mobile vehicle of the present invention does not emit exhaust gas on the road, and thus does not cause air pollution. Secondly, the smart mobile vehicle of the present invention can achieve the purpose of traveling in water and on-road, and overcomes the limitation that the electric vehicle can only travel on road. Moreover, the smart mobile vehicle of the present invention has a circular structure to improve vehicle safety.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

In the following paragraphs, a detailed description is provided for a thorough understanding of the figures listed above. Well-known structures and devices will also be used schematically for better comprehension.

Figure 1:
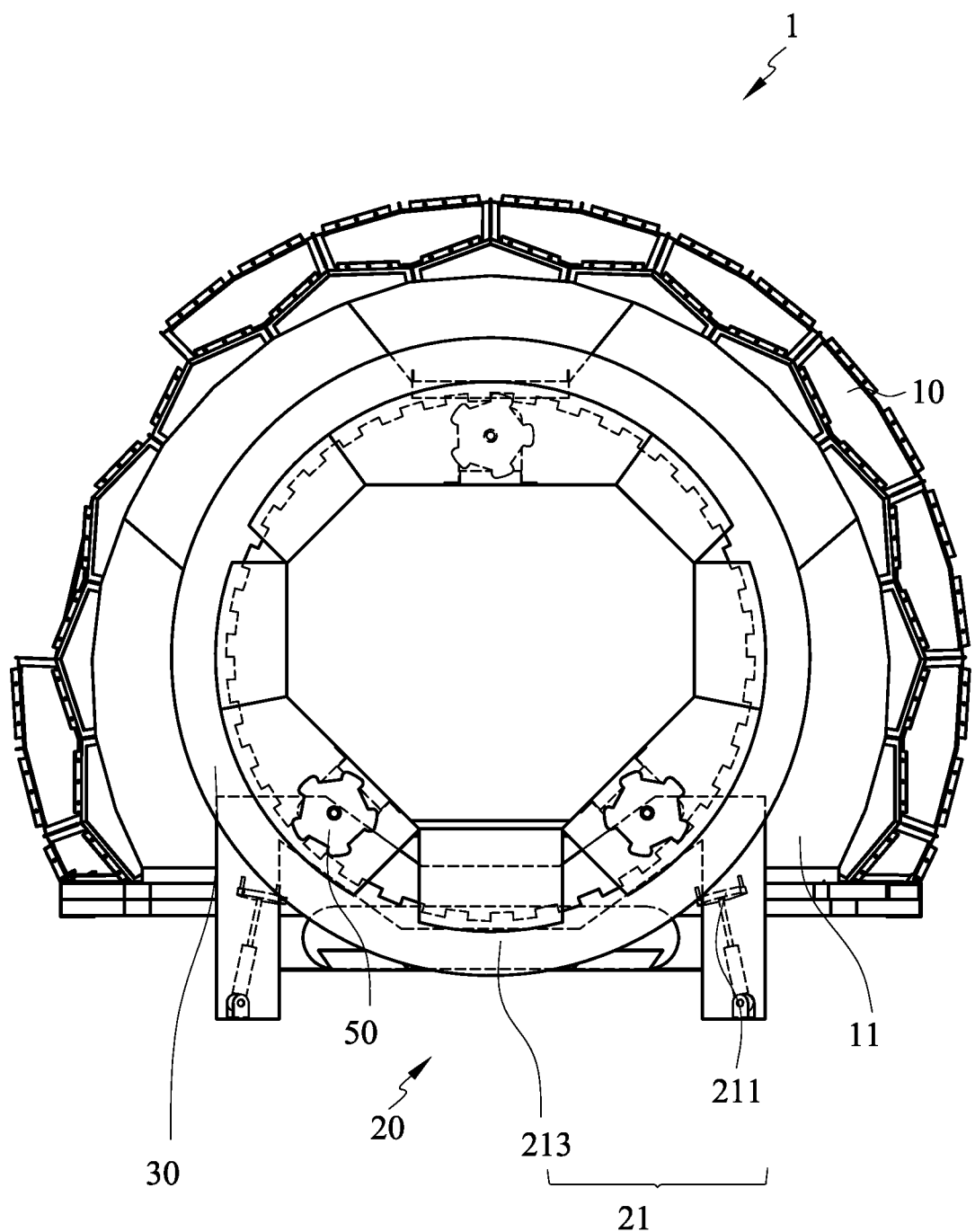
FIG. 1 is a side view of a smart mobile vehicle according to first embodiment of the present invention.
Figure 2:
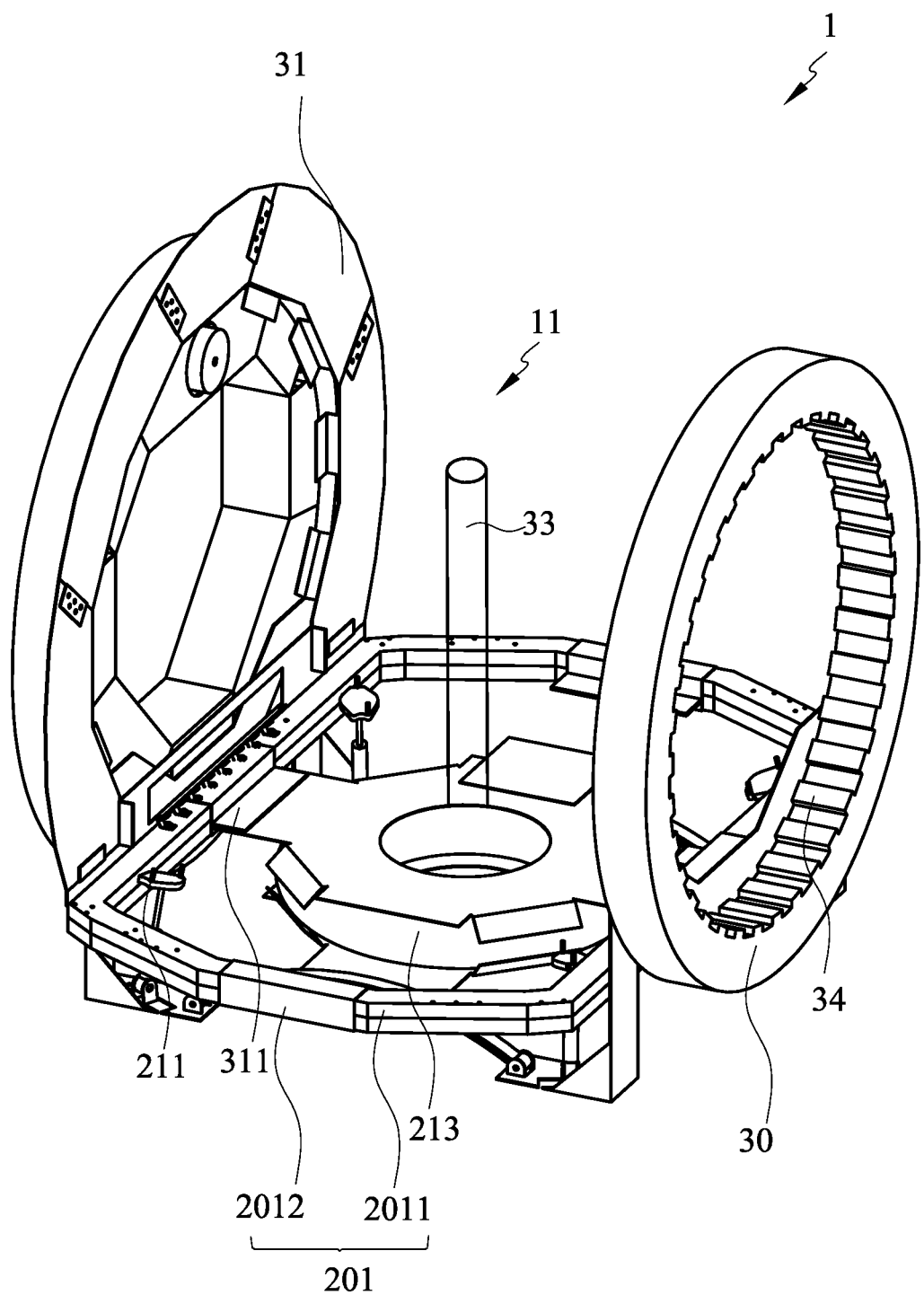
FIG. 2 is a stereoscopical schematic view of the smart mobile vehicle according to first embodiment of the present invention.
Figure 3:
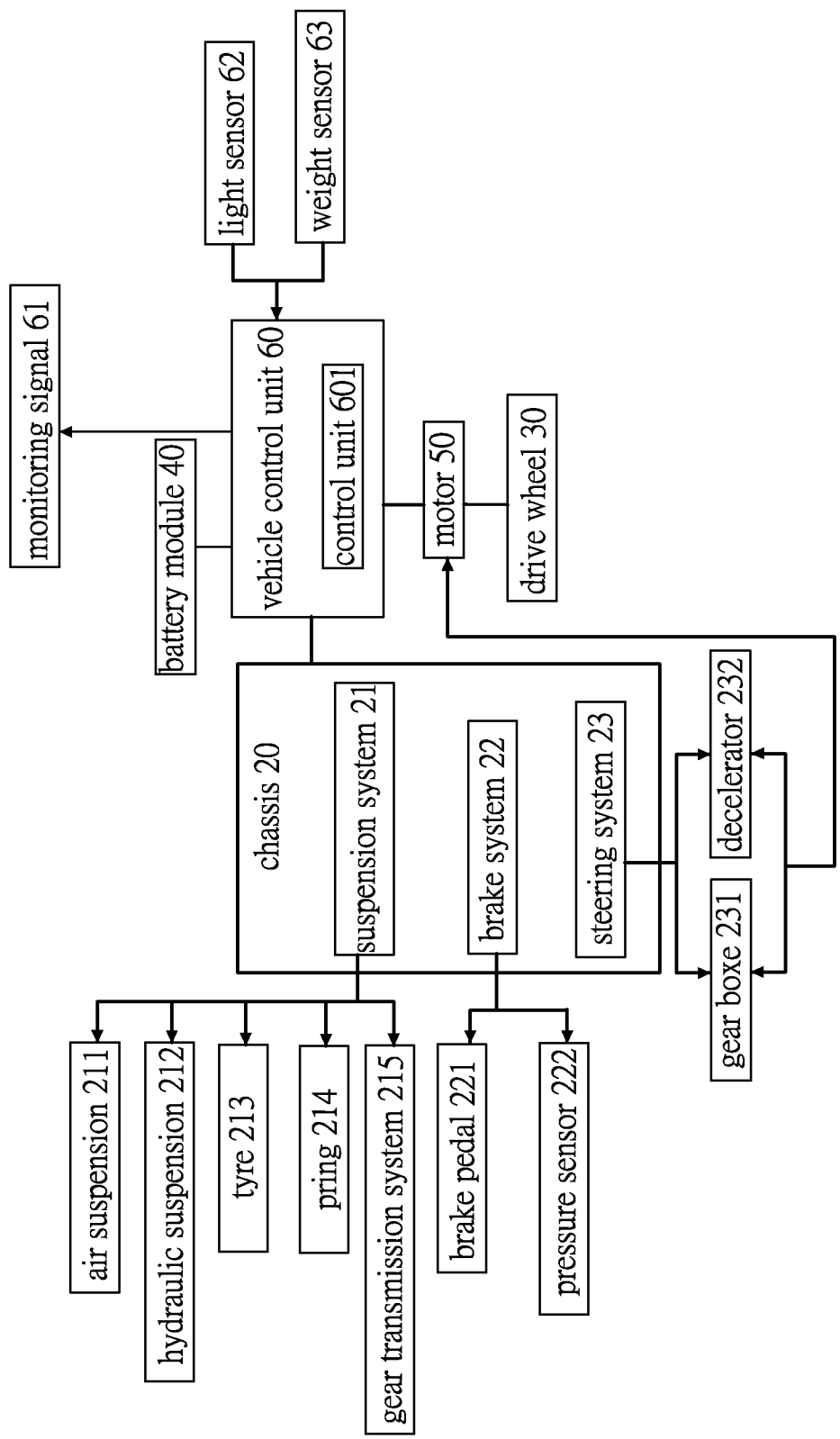
FIG. 3 is a block diagram of the smart mobile vehicle according to first embodiment of the present invention.

Please refer to FIG. 1 to FIG. 3, FIG. 1 is a side view of a smart mobile vehicle according to first embodiment of the present invention; FIG. 2 is a stereoscopical schematic view of the smart mobile vehicle according to first embodiment of the present invention; and FIG. 3 is a block diagram of the smart mobile vehicle according to first embodiment of the present invention.

As seen in FIG. 1 to FIG. 3, the present invention provides a smart mobile vehicle 1 comprising a vehicle body 10, a chassis 20 with multiple forms of suspensions, two driving wheels 30, a battery module 40, a plurality of motors 50 and a vehicle control unit 60. First, the vehicle body 10 has an accommodation space 11, the accommodating space 11 is a square structure, and the vehicle body 10 is composed of a plurality of plates or a plurality of pipes. In an embodiment, the vehicle body 10 and the chassis 20 have a lifting structure for raising the vehicle body 10. Secondly, the chassis 20 is asymmetrical chassis and mounted on the bottom of the vehicle body 10, and the chassis 20 has a suspension system 21, a brake system 22 and a steering system 23, wherein the suspension system 21 is connected to the vehicle body 10; wherein the suspension system 21 has at least two air suspensions 211 or airbags (not shown), at least one hydraulic suspensions 212, a tire 213, a spring 214, and a gear transmission system 215. Further, the two driving wheels 30 are composed of a plurality of circular units 32, each of the circular units 32 is composed of a plurality of metal, wood or carbon fiber 321, and the two driving wheels 30 are embedded in two-wheel frames 31 on two sides of the vehicle body 10; wherein the two-wheel frames 31 are connected to a chassis frame 201 by inserts, pins or at least two fasteners 311, the steering of the two driving wheels 30 is controlled by a rocker module 33 and the steering system 23, the two driving wheels 30 respectively have having a plurality of circular members 323 in a tail groove form 34, and the circular members 323 fixed in the tail groove form 34 by a fixing structure 322 and a positioning member. Any of the circular members 323 may be a PU ball, a rubber ball or a ball having strength and elasticity, and the PU ball may become a gas exchange device and used for discharging heat. Further, the PU ball may have a liquid or a coolant, and the flow of the liquid or the coolant may discharge the heat generated by the two driving wheels 30. Furthermore, the battery module 40 provides the smart mobile vehicle 1 with driving power and the battery module 40 is a gravity battery. In addition, the plurality of motors 50 disposed between the two circular units 32 or on a surface of any one of the circular units 32; wherein the motors 50 are electrically connected to the battery module 40, and the torque and directional outputs of the motors 50 is used to drive the rotation of the two driving wheels 30. Finally, the vehicle control unit 60 is electrically connected to the motors 50 and the battery module 40 to transmit a monitoring signal 61.

As shown in FIG. 2, the shape of the chassis frame 201 can be randomly varied based on the user's requirements. The shape of the chassis frame 201 can be a hexagonal body, an elliptical shape, or a circular shape, but the present invention is not limited thereto. In this case, the hexagonal chassis frame 201 is used for a passenger, and the elliptical chassis frame 201 is used for industrial use and has higher strength. Next, the chassis frame 201 is composed of a plurality of columns 2011, and the columns are locked by a plurality of kits 2012; wherein the shapes of the columns 2011 can be randomly varied based on the user's requirements. The shape of the columns 2011 may be a triangular tube, a square tube, a circular tube or a polygonal tube, but the present invention is not limited thereto. In an embodiment, the columns 2011 may be differently shaped columns or columns with the same shape. The plurality of columns 2012 are locked by the kits 2012 to form the chassis frame 201. In another embodiment, the plurality of columns 2011 may constitute the chassis frame 201 by welding techniques. In another embodiment, the plurality of columns 2011 may constitute the chassis frame 201 by press-fitting. In another embodiment, the columns 2011 can be joined by a sleeve to form the chassis frame 201. The sleeve can be made of a resilient PU material and a cast iron or composite material. As described above, the lock positions of the columns 2011 may be in the area of the suspension system 21, or the kits 2012 may be locked in the middle of the vehicle. It can be determined that the upper and lower displacements of the two driving wheels 30 of the smart mobile vehicle 1 have a buffering on both sides. Furthermore, the columns 2011 may be filled with a gas or a foam (for example, a PU foam) such that the columns 2011 have buoyancy. In addition, the materials of the columns 2011 can be randomly varied based on the user's requirements. The materials of the columns 2011 can be a metal material, a carbon fiber composite material or a hard material with strong impact resistance, but the present invention is not limited thereto. Further, the appearance of the columns 2011 can further waterproof by the existing waterproof technology. In a preferred embodiment, the columns 2011 may be a plurality of straight tubes and coated with a plurality of carbon fiber tubes outside the straight tubes, and further, the straight tubes are filled with gas or foam.

As shown in FIG. 2, the vehicle body 10 of the smart mobile vehicle 1 of the present invention is almost a square vehicle, and therefore, the center of gravity of the smart mobile vehicle 1 is very low. Because the smart mobile vehicle 1 can be as a unit, the smart mobile vehicle 1 can be connected with one side of any type of vehicle or space in series. Therefore, it can be manufactured in any type, such as a ring, a square or a cube, and can be connected to a vehicle or a space on each side of the smart mobile vehicle 1 in series or in parallel. Since the smart mobile vehicle 1 can be coupled to an airtight chamber, the smart mobile vehicle 1 can be used as other spaces, such as a seabed, an outer space or a vacuum environment.

As shown in FIG. 1 to FIG. 2, the two driving wheels 30 and the chassis 20 of the smart mobile vehicle 1 of the present invention are designed separately, so that when the smart mobile vehicle 1 is collided, the person sitting inside will not have any harm. When the two-wheel frames 31 of the two driving wheels 30 is collided, the circular design of the smart mobile vehicle 1 makes the two driving wheels 30 bounce, roll or split. It is very safe to people sitting inside the body 10; therefore, the person sitting inside the vehicle body 10 is very safe. The two driving wheels 30 have a circular shape and can provide a very large torque. In addition, because the two-wheel frames 31 are large, the rotation speed is slow, and the diameters of the two driving wheels 30 are large; therefore, the two driving wheels 30 across any field. The power logic of the two drive wheels 30 uses the concept of an eccentric shaft. Each point of the eccentric shaft is a motor 50 at each point, and anyone of the two-wheel frames 31 can be equipped with 1 to 10 motors to provide the torque with 1 to 10 times. The two drive wheels 30 of the present invention can be used in high torque applications or vehicles, such as emergency pumps, elevators, excavators, earthmoving machinery or differential drives.

In addition, the size of the two driving wheels 30 of the present invention can be randomly varied based on the user's requirements. The diameters of the two driving wheels 30 of the smart mobile vehicle 1 are between 1.5 and 2.2 meters, and anyone of the two driving wheels 30 has a thickness of 15 cm, and a person can directly enter the vehicle body 10, but the present invention is not limited thereto. The shape of the two driving wheels 30 can be randomly varied based on the user's requirements. The two driving wheels 30 are single circular, multi-circular tubes, plate-shaped, modular tubes, and the cutting section is water droplets, circles, rectangles, and polygons. In a preferred embodiment, the two drive wheels 30 are circular in shape. Moreover, the motors 50 are arranged at one-third of the bottom of the two drive wheels 30, so the center of gravity is very low. In addition, the power of each of the motors 50 is 3 to 20 kW.

As shown in FIG. 1 and FIG. 3, the steering system 23 further comprises a plurality of gearboxes 231 connected to the motors 50. The gearbox 231 has an acceleration or deceleration machine 232, and the acceleration or deceleration machine 232 causes the two the drive wheel 30 generates a differential speed to drive the smart mobile vehicle 1 to turn As shown in FIG. 1 and FIG. 3, the steering system 23 further comprises a plurality of gearboxes 231 connected to the motors 50. The gearbox 231 has an acceleration or deceleration machine 232, and the two drive wheel 30 generates a differential speed through the acceleration or deceleration machine 232 to drive the smart mobile vehicle 1 to turn. When the smart mobile vehicle 1 turns left, the left wheel speed of the two driving wheels 30 is larger than the right wheel speed, and when the person sitting on the left side is heavier, it is necessary to add a larger torque. When the rotational speed of the smart mobile vehicle 1 exceeds a certain value, a skew wheel is ejected. In a preferred embodiment of the present invention, the specific value is 60-80 km/h, but the present invention is not limited thereto. The inclined wheel is a pulley structure. When the smart mobile vehicle 1 is overturned, the inclined wheel can support the smart mobile vehicle 1 to avoid overturning. Alternatively, according to the surrounding environmental conditions of the smart mobile vehicle 1, the pulley structure provides a center of gravity or vertical height of a cabin by gears. The smart mobile vehicle 1 can travel on the water when the center of gravity or vertical height of the cabin is adjusted to be higher than the water surface; and the smart mobile vehicle 1 can travel on the road when the center of gravity or vertical height of the cabin is in the general position.

Figure 4:
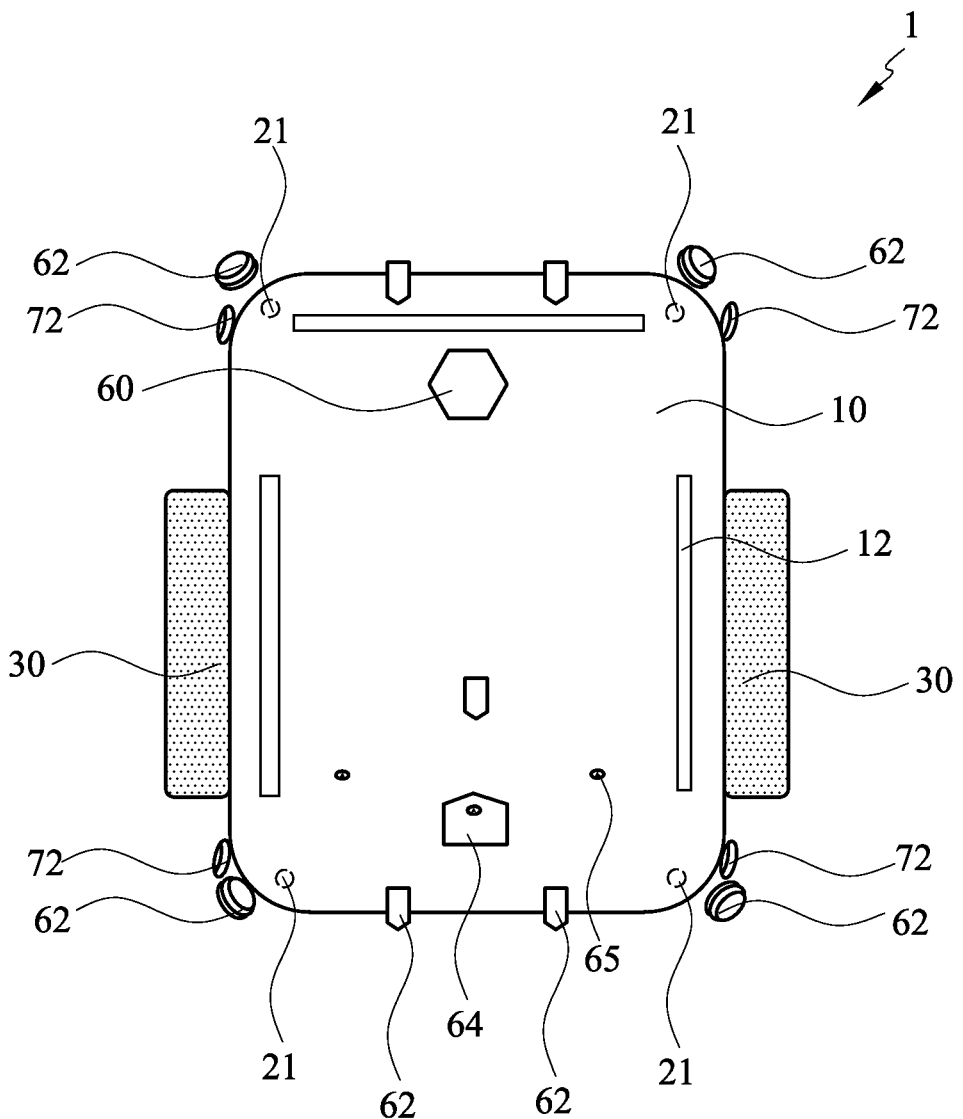
FIG. 4 is a schematic top view of the smart mobile vehicle according to first embodiment of the present invention.
Figure 5A:
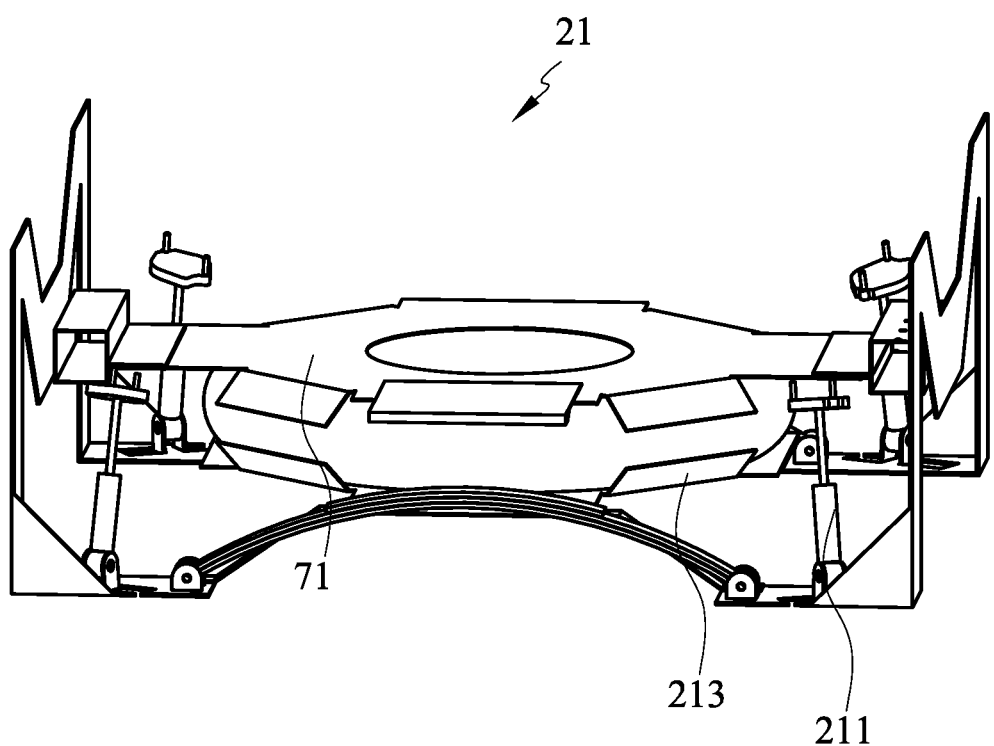
FIG. 5a is a stereoscopical schematic view of a suspension system of the smart mobile vehicle according to first embodiment of the present invention.
Figure 5B:
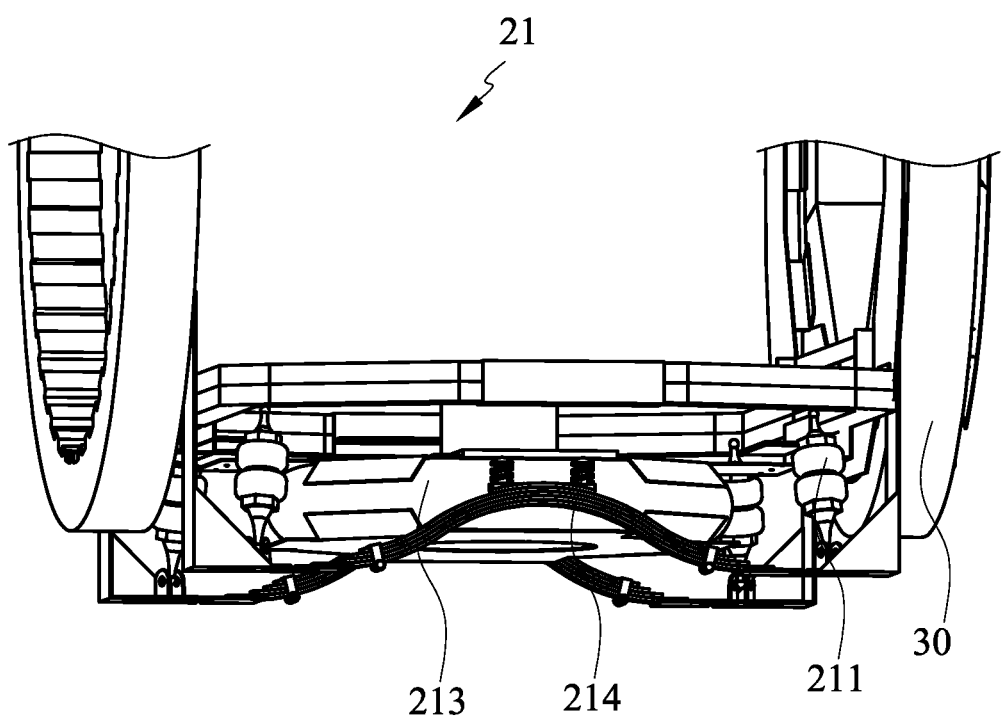
FIG. 5b is a stereoscopical schematic view of a spring attached on a suspension system of the smart mobile vehicle according to first embodiment of the present invention.

Please refer to FIG. 4, FIG. 5a and FIG. 5b, FIG. 4 is a schematic top view of the smart mobile vehicle according to first embodiment of the present invention; FIG. 5a is a stereoscopical schematic view of a suspension system of the smart mobile vehicle according to first embodiment of the present invention; and FIG. 5b is a stereoscopical schematic view of a spring attached on a suspension system of the smart mobile vehicle according to first embodiment of the present invention.

As shown in FIG. 5a and FIG. 5b, the suspension system 21 has at least two air suspensions 211, at least one hydraulic suspensions (not shown), a tire 213, a spring (not shown), and a gear transmission system (not shown). When the smart mobile vehicle 1 is collided, the air suspension 211 can withstand a first segment of impact, the tire 213 can withstand a second segment of impact, the tire 213 has a gas tension, and when the smart mobile vehicle 1 is collided, the gas inside the tire 213 will flow into an airbag (not shown) in the two driving wheels 30. As shown in FIG. 5b, the suspension system 21 further comprises a spring 214 having an extension capability to maintain the smart mobile vehicle 1 perpendicular to the center of the earth in an uphill or downhill condition. When the smart mobile vehicle 1 falls, the large propelling device will automatically set to natural rotation, and the suspension system 21 can be extended to the maximum value according to the reading of the light sensor to obtain the true distance between the ground and the smart mobile vehicle 1 to determine the impact force. When the smart mobile vehicle 1 is collided, the smart mobile vehicle 1 moves forward by the rotation of the two drive wheels 30, and the maximum safety for the passengers is provided in the smart mobile vehicle 1. Further, as shown in FIG. 5a, the smart mobile vehicle 1 further comprises a floor structure 71 capable of lifting and pulling, connected to the suspension system, and used as an infinite walking platform for the game by an external shock absorber or a push rod.

As shown in FIG. 4, due to the unique shape of the body 10 of the smart mobile vehicle 1, the space within the vehicle body 10 can be marked with elastic cords, straps, systems or circular rings, and the player's limbs and torso are held or tied by the extendable rod base to mimic flight flips or other movements. The two driving wheels 30 of the smart mobile vehicle 1 can be as a huge outing environment, and the internal restraint ring can be as a travel pod or a bubble in the mythical as like. The individual motion can be seen as an individual moving in the smart mobile vehicle 1, which creates a multi-layer rotation dimensions with large screen and display in the game. The smart mobile vehicle 1 and inner fitting ring uses transparent glass or monitor as vehicle windows, which also can be as a screen to project images or dent as bullet wound or glass shot hole to mimic all sorts of visual impact thru the gun fighting scenarios in the game. Due to the power belt and floor shape of the floor structure 71 capable of lifting and pulling, various natural movements in the game can be simulated. In addition, a camera 72 can be mounted on the roof (or using an autonomous camera as a light source) both inside or outside of the smart mobile vehicle 1 to capture the view angles from the of the smart mobile vehicle's first perspective and the windshield's second perspective view. By the camera 72 of the smart mobile vehicle 1 communicates with the cloud server and connects to the cloud server of the surrounding security camera, the cloud server infuses the captured environment or elements into the game, which give multiple third-person perspectives to build up a true and almost real-time response scenario or storylines to interact with players or give passenger a unique visual effects or introductions of drive-by scenic spots. Furthermore, the smart mobile vehicle 1 of the present invention has a door activation controller 64 and at least one door sensor 65. The door activation controller 64 is connected to the vehicle control unit 60 and the door sensor appliance 65. Further, the door opening method of the smart mobile vehicle 1 can comprise: a method of pushing the door outward and moving upward, a multi-piece opening mode, and a turning opening mode.

Figure 6:
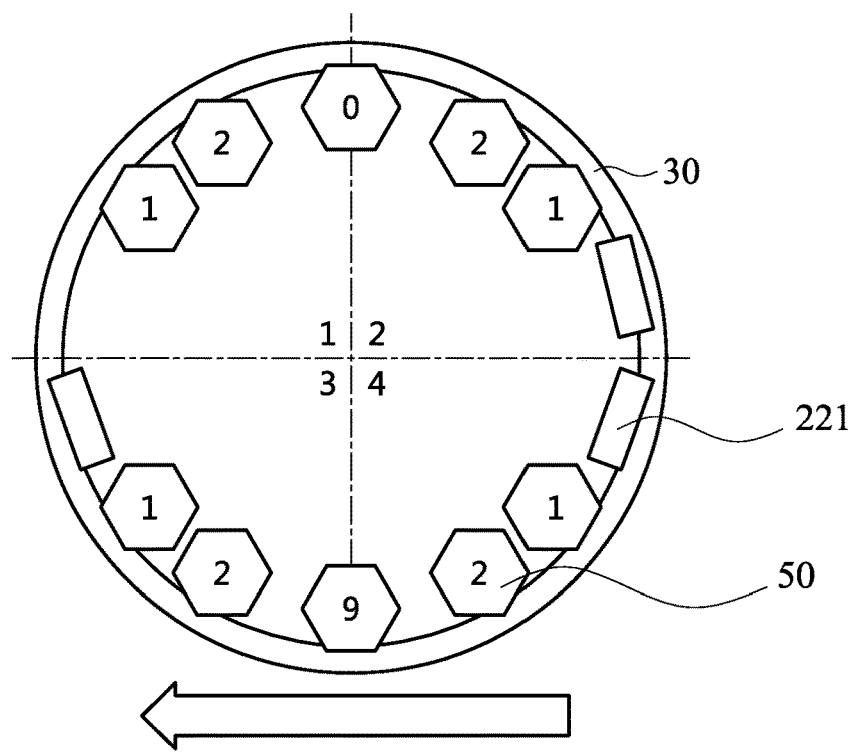
FIG. 6 is a schematic view of the motor of the smart mobile vehicle driving the two driving wheels according to first embodiment of the present invention.

Please refer to FIG. 6, FIG. 6 is a schematic view of the motor of the smart mobile vehicle driving the two driving wheels according to first embodiment of the present invention.

As shown in FIG. 3 and FIG. 6, the brake system 22 comprises a brake function or a pedal 221 at least a brake disc in each wheel, at least a brake clamp in each wheel, at least an anti bake system with each wheel, at least a optical sensor and a pressure sensor 222. when the brake signal is given or pedal stepped, the smart mobile vehicle is braked to drive the brake system to decelerate the two driving wheels as primary speed reducer, the vehicle control unit is connected to the pressure sensor to receive a pressure by the pressure sensor to converted into the monitoring signal, the vehicle control unit is connected to a light gate sensor to receive the round per minute count by the optical sensor to converted into the monitoring signal and transmitted to a brake caliper to brake a large wheel disc by clamp/drum or ABS; or a drive shaft in a gearbox or a clutch attached on the shaft to decelerated to brake. As shown in FIG. 6, the two driving wheels 30 can be divided into four regions, namely, a first zone, a second zone, a third zone, and a fourth zone. The motors 50 are numbered as a No. 0 motor, a No. 1 motor, and a No. 2 motor. No. 9 motor. In an embodiment of the present invention, the two driving wheels 30 are driven in the direction of the arrow by the following driving steps of the motors 50, and the order is to drive the No. 9 motor, the No. 2 motor of the fourth zone, No. 2 motor of the third zone, No. 1 motor of the fourth zone, No. 1 motor of the third zone, No. 2 motor of the second zone, No. 0 motor, No. 2 motor of the first zone, No. 1 motor of the second zone and No. 1 motor of Zone 1.

Figure 7:
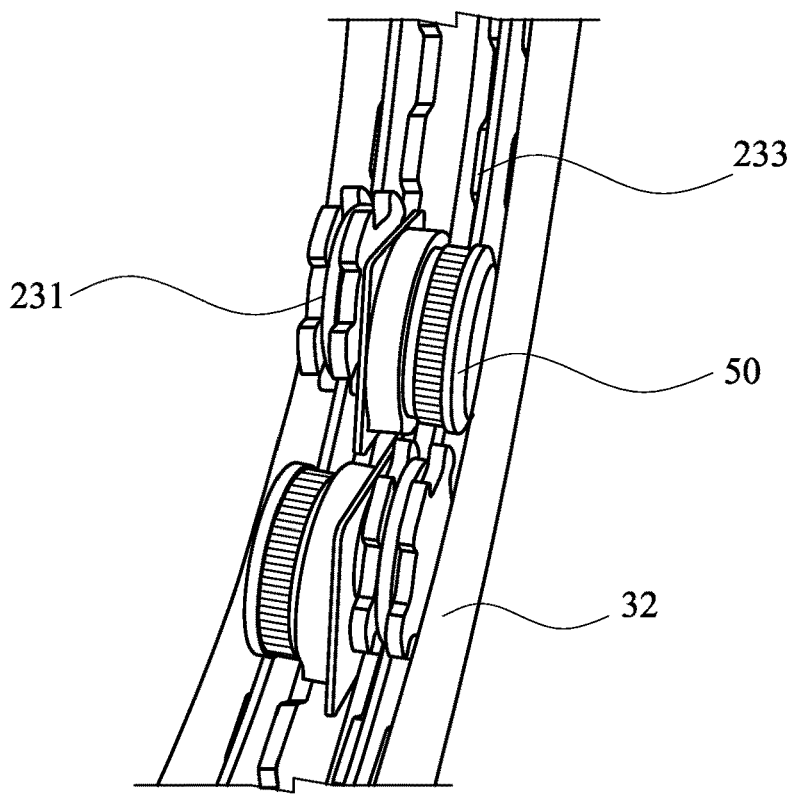
FIG. 7 is a schematic view of motors arrangement of the smart mobile vehicle according to first embodiment of the present invention.

Please refer to FIG. 7, FIG. 7 is a schematic view of motors arrangement of the smart mobile vehicle according to first embodiment of the present invention.

As shown in FIG. 7, the motors 50 are disposed in the middle of any two of the circular units 32, and the gearbox 231 and the plurality of magnetic elements 233 are disposed in the circular units 32. Furthermore, the gearbox 231 and the magnetic elements 233 are operated on the circular units 32, and the torque and directional outputs of the motors 50 are driven to drive the two driving wheels 30.

Figure 8:
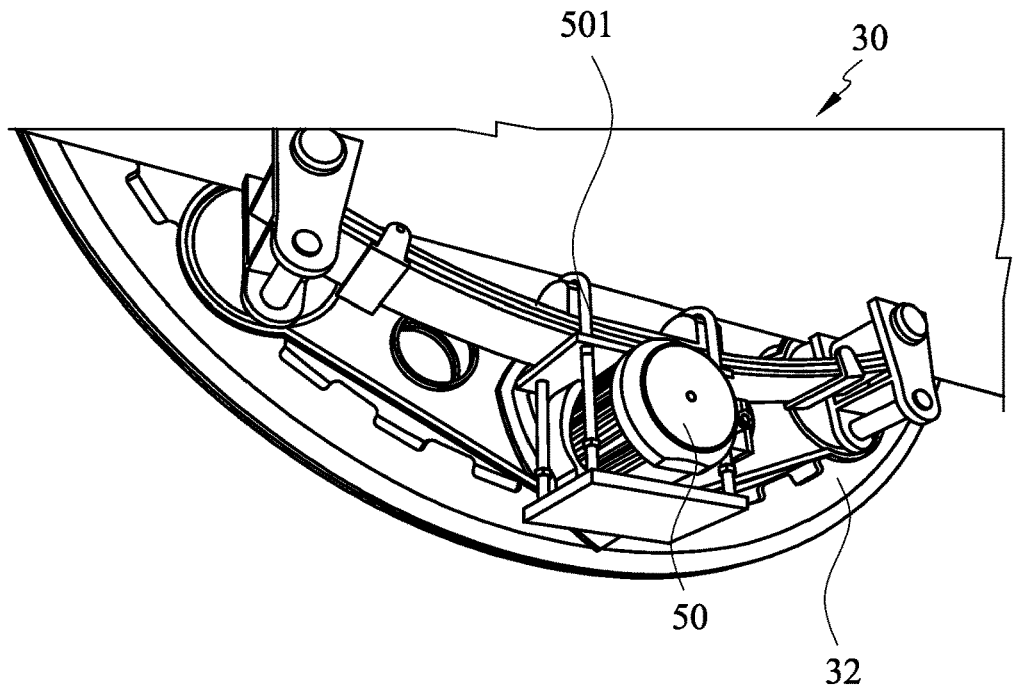
FIG. 8 is a schematic view of motors arrangement of the smart mobile vehicle according to second embodiment of the present invention.

Please refer to FIG. 8, FIG. 8 is a schematic view of motors arrangement of the smart mobile vehicle according to second embodiment of the present invention.

As shown in FIG. 8, the motors 50 are disposed on a surface of any of the circular units 32 by a fixing base 501. The motors 50 are electrically connected to the battery module (not shown), and torque and directional outputs of the motors 50 drive the rotation of the two drive wheels 30.

Figure 9:
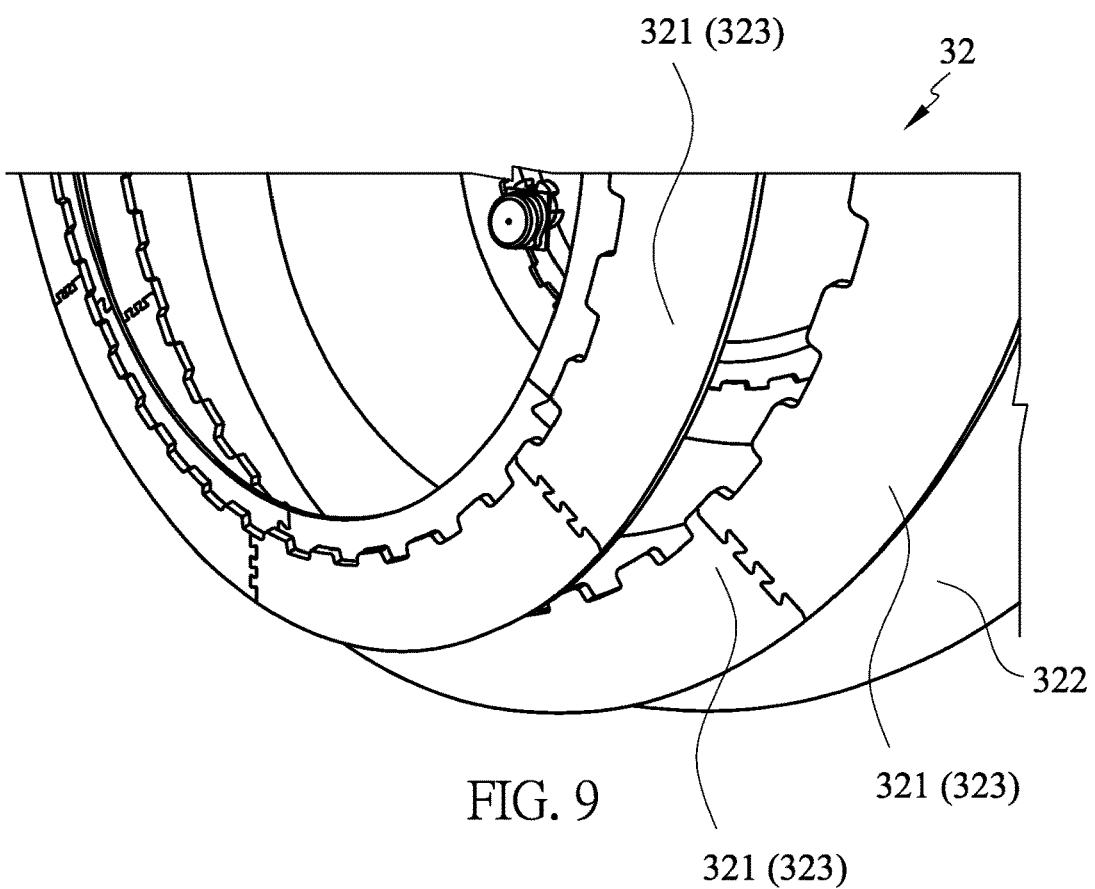
FIG. 9 is a stereoscopical schematic view of two driving wheels of the smart mobile vehicle according to first embodiment of the present invention.

Please refer to FIG. 9, FIG. 9 is a stereoscopical schematic view of two driving wheels of the smart mobile vehicle according to first embodiment of the present invention.

As shown in FIG. 9, each of the circular units 32 is composed of a plurality of metal, wood or carbon fiber 321, and aluminum, nylon or wear-resistant foam are present in the metal, wood or carbon fiber sheets 321 to reduce noise. In a preferred embodiment of the invention, each of the circular units 32 is composed of six metals, woods or carbon fiber sheets.

Figure 10B:
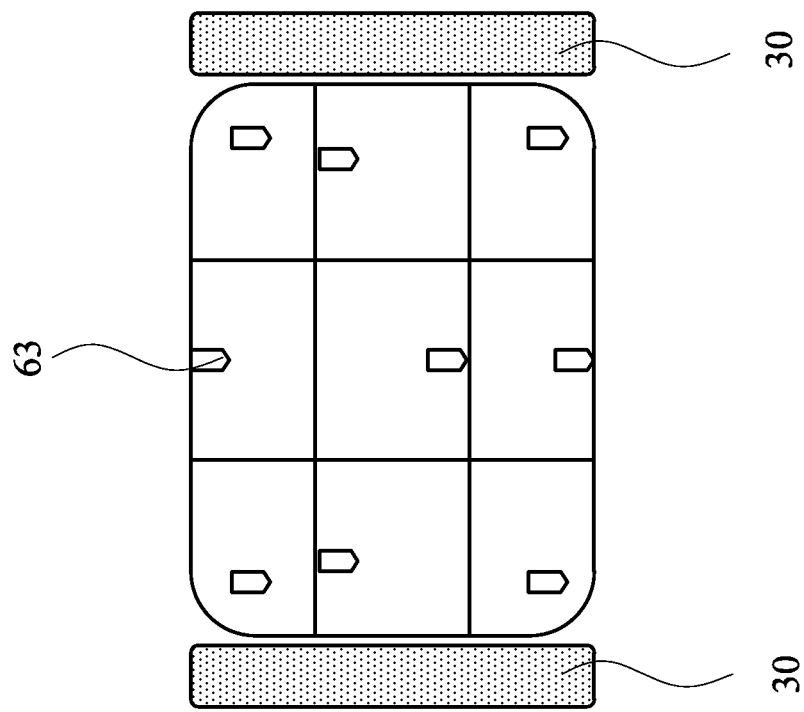
FIG. 10b is a schematic view of a weight sensor of the smart mobile vehicle according to third embodiment of the present invention.
Figure 10A:
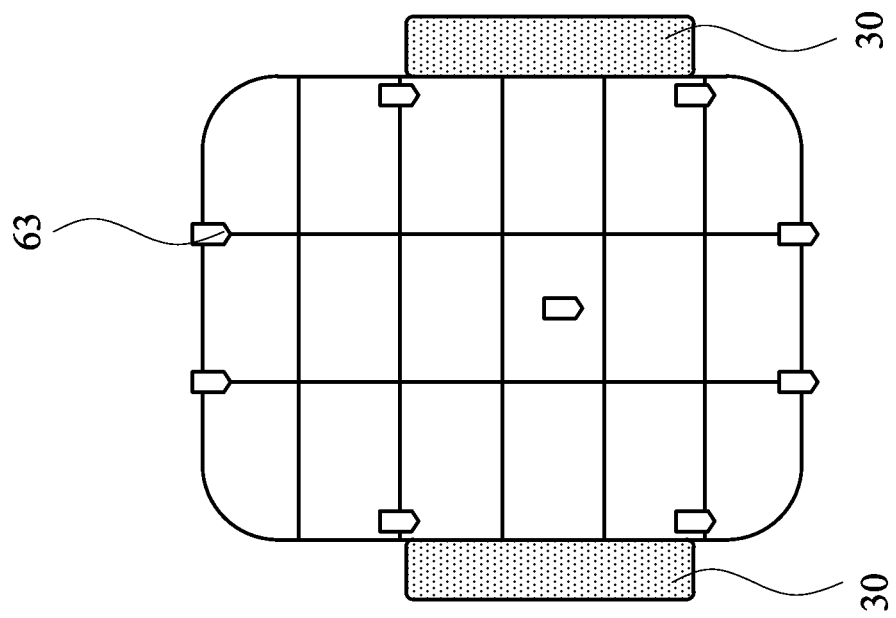
FIG. 10a is a schematic view of a weight sensor of the smart mobile vehicle according to first embodiment of the present invention.

Please refer to FIG. 10a and FIG. 10b, FIG. 10a is a schematic view of a weight sensor of the smart mobile vehicle according to first embodiment of the present invention; and FIG. 10b is a schematic view of a weight sensor of the smart mobile vehicle according to third embodiment of the present invention.

As shown in FIG. 10a and FIG. 10b, vehicle stability or a control instrument, weight sensor system the smart mobile vehicle further comprises a weight sensor system 63 connected to the vehicle control unit, wherein the weight sensor system 63 is a vehicle stability and control instrument that the vehicle control unit is connected to the weight sensor system 63 to receive a pressure by the pressure sensor to converted into the monitoring signal, to obtain the speed, directional, momentum calculation, vehicle loading value of the smart mobile vehicle, and the distributive values are transmitted to the vehicle control unit to fine-tune the output of two drive wheels 30.

Figure 11:
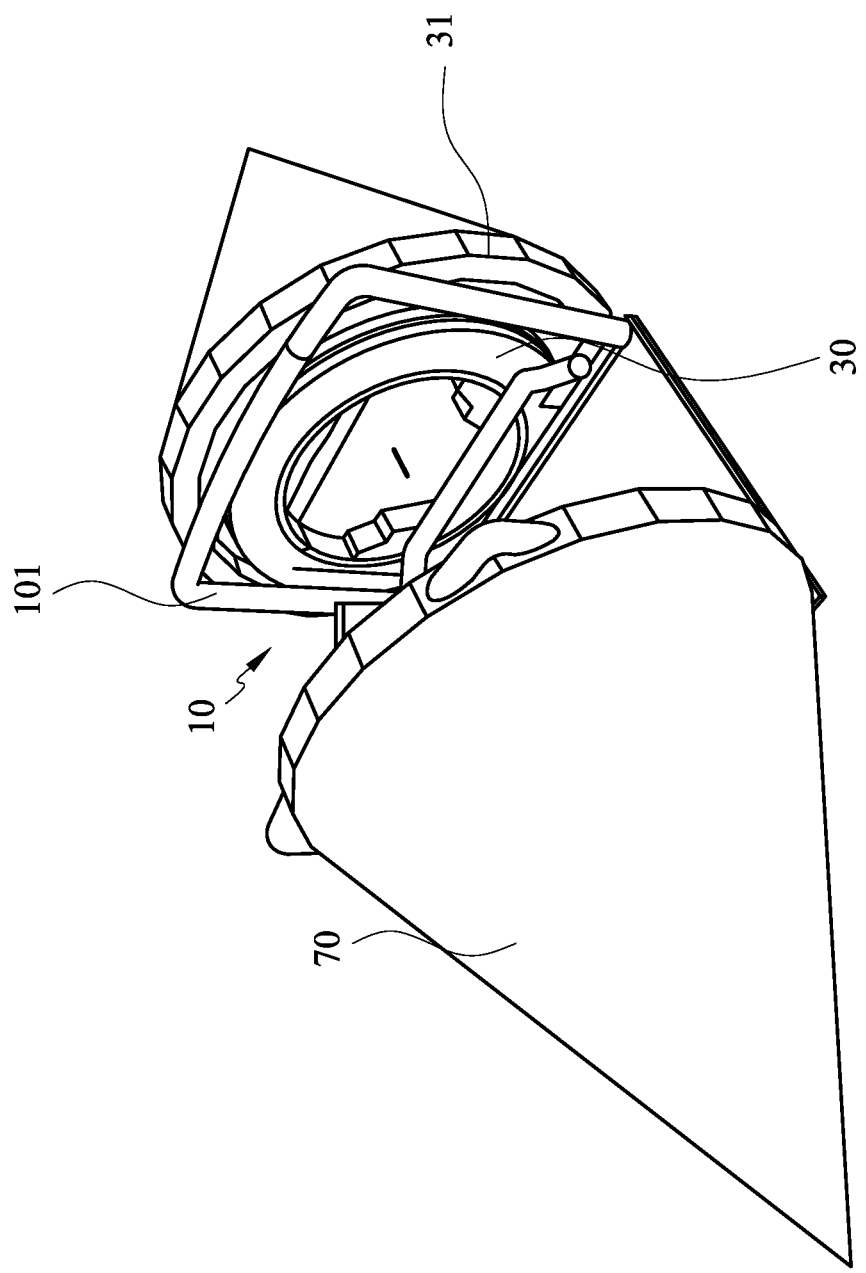
FIG. 11 is a schematic view of an outer cover of the smart mobile vehicle according to first embodiment of the present invention.

Please refer to FIG. 11, FIG. 11 is a schematic view of an outer cover of the smart mobile vehicle according to first embodiment of the present invention.

As shown in FIG. 11, the smart mobile vehicle 1 further comprises at least one outer cover 70 that is movably disposed on the two-wheel frame 31, the outer cover 70 is an outer tapered structure or a V-shaped structure; and the magnetic components 231 used for electricity or signal generation are embedded in the two-wheel frames 31. Further, a tapered shape of the outer cover 70 can be used as a strong bulletproof structure to prevent lateral attack. The tapered shape can also be used as a tapered tip parallel to the direction of travel. In particular, the two-wheel frame 31 has a ring formed by the magnetic elements to ensure the floating of the smart mobile vehicle 1 in the super-tubular moving motion. In addition, the two driving wheels 30 of the smart mobile vehicle 1 can also be powered by the magnetic component, and the magnetic component can be as the floating support in a system such as a super loop. Alternatively, it can be used as a rotating mechanism like a fast spindle, without tilting or loosening during driving. Further, since the smart mobile vehicle 1 has the property that the two driving wheels 30 are separated from the vehicle body 10, the vehicle body 10 can also be installed by a vertical fixing device 101 or a clip (not shown) and a clamp (not shown).

Figure 12:
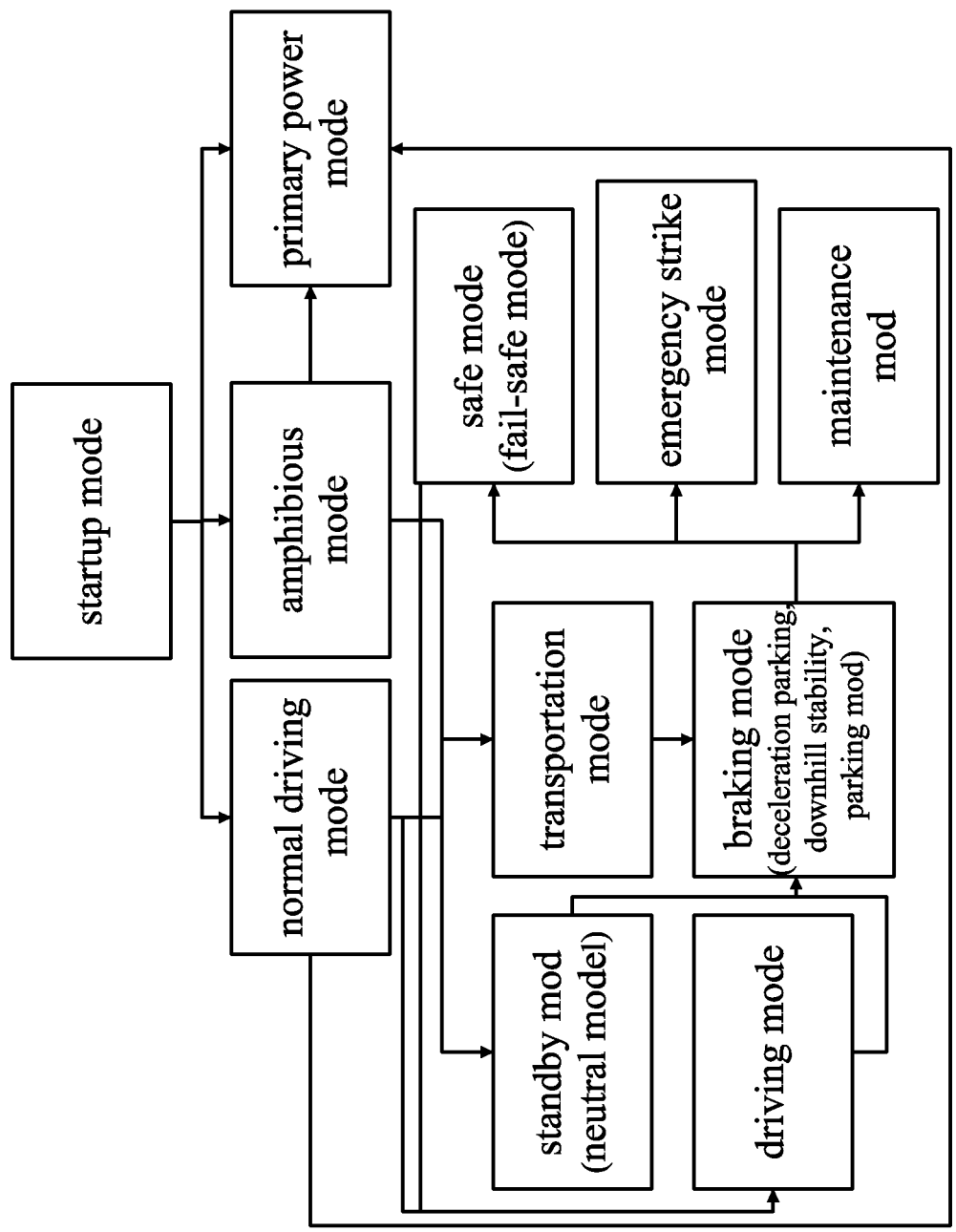
FIG. 12 is a schematic diagram of a control mode of the smart mobile vehicle according to first embodiment of the present invention.

Please refer to FIG. 12, FIG. 12 is a schematic diagram of a control mode of the smart mobile vehicle according to first embodiment of the present invention.

As shown in FIG. 12, the startup mode of the smart mobile vehicle of the present invention can be divided into a normal driving mode, an amphibious mode and a primary power mode. Furthermore, the normal driving mode and the amphibious mode can be further divided into a standby mode (ie, a neutral mode), a driving mode, and a transportation mode (ie, a braking mode), including a deceleration parking, a downhill stability, and a parking mode. Further, the driving mode can be divided into a safe mode (ie, fail-safe mode), an emergency strike mode, and a maintenance mode.

Figure 13A:
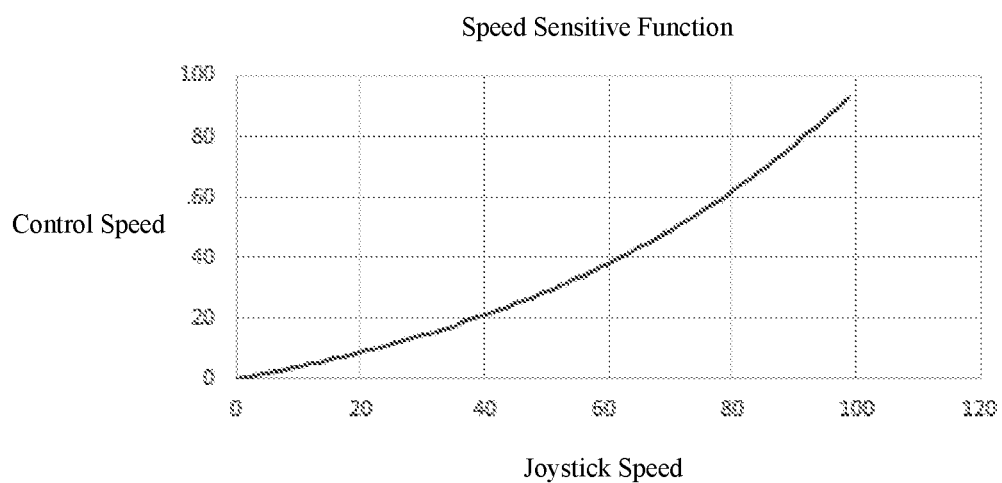
FIG. 13a is a curve diagram showing the relationship between actual control rate and rocker control value of the smart mobile vehicle of the present invention.

Please refer to FIG. 13a, FIG. 13a is a curve diagram showing the relationship between actual control rate and rocker control value of the smart mobile vehicle of the present invention. As shown in FIG. 13a, the smart mobile vehicle 1 has excessive steering offset due to sensitive control at different speeds, resulting in unstable vehicle conditions. Therefore, the smart mobile vehicle 1 is corrected by the following mathematical equations:

$$SF: F(x)=(22.22)*(e^{x/60}-1)$$

SF: Sensitive Function

JS: Joystick Speed, JS can be angle or voltage, three-dimensional is defined by the plane x,y the angle is defined by the coordinate x,y position; and the voltage is defined by the coordinate x,y position.

CS: Control Speed (km/hr)○

Figure 13B:
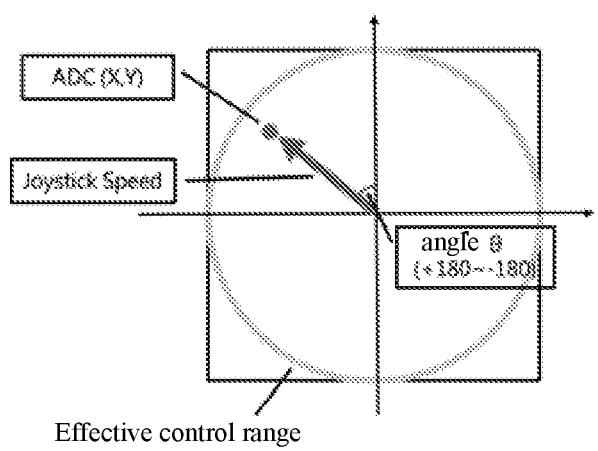
FIG. 13b is a curve diagram of rocker module of the smart mobile vehicle of the present invention.

Please refer to FIG. 13b, FIG. 13b is a curve diagram of rocker module of the smart mobile vehicle of the present invention. As shown in FIG. 13b, the range represented by the circle indicates the range in which the joystick can move, the angle (θ) ranges from +180 to −180; ADC(X, Y) represents the speed control sensitivity function; θ represents the joystick control angle value; Cθ (control θ) control angle value.

Figure 13C:
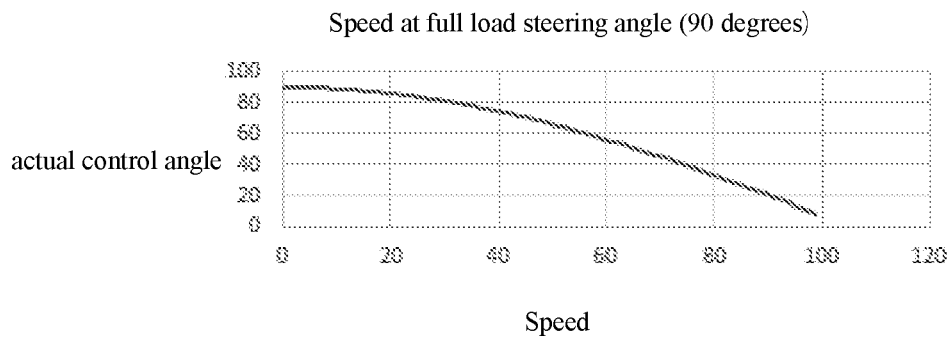
FIG. 13c is a curve diagram showing the relationship between the actual control angle and the speed of the smart mobile vehicle.

Please refer to FIG. 13c, FIG. 13c is a curve diagram showing the relationship between the actual control angle and the speed of the smart mobile vehicle. As shown in FIG. 13c, x-axis is the actual control angle and y-axis is the speed. Cθ=θ*cos(CS/67) the actual control rate will reduce the sensitivity due to the actual speed of the smart mobile vehicle, avoiding excessive speed and high steering conditions.

Figure 13D:
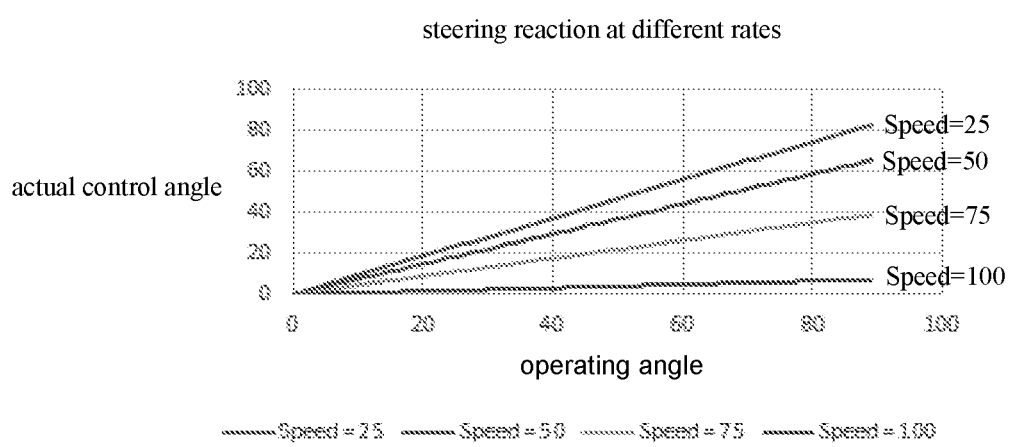
FIG. 13d is a curve diagram showing the relationship between the actual control angle and the operating angle of the smart mobile vehicle.

Please refer to FIG. 13d, FIG. 13d is a curve diagram showing the relationship between the actual control angle and the operating angle of the smart mobile vehicle. As shown in FIG. 13d, x-axis is the actual control angle, the y-axis is the steering angle, the blue line represents the speed 25 (km/hr), the red line represents the speed 50 (km/hr), the gray line represents the speed 75 (km/hr), and the yellow line represents the speed 100 (km/hr). Further, the left motor control value (LM) of the motors provided on the left side drive wheel of the smart mobile vehicle: LM=CS*(1−Cθ); the right motor control value (RM): RM=CS*(1−Cθ); Cθ*cos(CS/67); actual control rate: CS=(22.22)*(e^(JS/60)−1); wherein the function considers the angle of +90~−90, and the smart mobile vehicle will be in constant speed if the angle is greater than +90~−90.

The above descriptions for each figure explain the principles of the disclosure and its practical applications. The embodiments depicted above and the appended drawings are exemplary and are not intended to be exhaustive or to limit the scope of the disclosure. Modifications and variations are possible in view of the above teachings.

I claim:

1. A mobile vehicle, comprising:
   a vehicle body having an accommodation space;
   a chassis to be asymmetrical chassis and mounted on the bottom of the vehicle body, having a suspension system, a brake system, a networking communication system and a steering system; wherein the suspension system is connected to the vehicle body;
   two driving wheels composed of a plurality of circular units, each of the circular units composed of a plurality of metal, wood or carbon fiber, and the two driving wheels embedded in two-wheel frames on two sides of the vehicle body; wherein the two-wheel frames are connected to a chassis frame by at least two fasteners, the steering of the two driving wheels is controlled by a rocker module and the steering system, the two driving wheels respectively have having a plurality of circular members in a tail groove form, and the circular members fixed in the tail groove form by a fixing structure and a positioning member;
   a battery module providing the mobile vehicle with driving power;
   a plurality of motors disposed between the two circular units or on a surface of any one of the circular units, wherein the motors are electrically connected to the battery module, and the torque and directional outputs of the motors is used to drive rotation of the two driving wheels; and
   a vehicle control unit electrically connected to the motors and the battery module to transmit a monitoring signal.

2. The mobile vehicle mentioned in claim 1, wherein the suspension system has at least two air suspensions or air bladders bag or rings, at least one hydraulic suspension, one tire, one spring, and one gear transmission system.

3. The mobile vehicle mentioned in claim 1, wherein the brake system includes at least an electronic controlled brake function or a physical brake pedal, at least a brake disc in each wheel, at least a brake clamp in each wheel, at least a anti brake system with each wheel, at least an optical sensor and a pressure sensor, when the brake signal is given or pedal stepped, the mobile vehicle is braked to drive the brake system to decelerate the two driving wheels as primary speed reducer, the vehicle control unit is connected to the pressure sensor to receive a pressure by the pressure sensor to converted into the monitoring signal, the vehicle control unit is connected to a light gate sensor to receive the round per minute count by the optical sensor to converted into the monitoring signal and transmitted to a brake caliper to brake a large wheel disc by clamp, drum or ABS; or a drive shaft in a gearbox or a clutch attached on the shaft to decelerated to brake.

4. The mobile vehicle mentioned in claim 1, further comprises level and distance detection sensor connected to the vehicle control unit, a distance between the vehicle body and the ground is obtained by optically reflecting through a light sensor, and transmits the distance to the vehicle control unit; wherein the level and distance sensor could be based on optical images, infrared sensors sonar sensors, or any sort of distance detect mechanism with signal.

5. The mobile vehicle mentioned in claim 1, further a weight sensor system connected to the vehicle control unit, wherein the weight sensor system is a vehicle stability and control instrument that the vehicle control unit is connected to the weight sensor to receive a pressure by the pressure sensor to converted into the monitoring signal, to obtain the speed, directional, momentum calculation, vehicle loading value of the mobile vehicle, and the distributive values are transmitted to the vehicle control unit to fine-tune the output of two drive wheels.

6. The mobile vehicle mentioned in claim 1, further comprises at least one outer cover that is movably disposed on the two-wheel frame, the outer cover is an outer tapered structure or a V-shaped structure; and the magnetic components used for electricity or signal generation are embedded in the two-wheel frames.

7. The mobile vehicle mentioned in claim 1, wherein the steering system further comprises a plurality of gearboxes connected to the motors, one of the gearboxes has an acceleration or deceleration machine; wherein the two drive wheels generate a differential speed through the acceleration or deceleration machine to turn the mobile vehicle.

8. The mobile vehicle mentioned in claim 1, further comprises a bevel wheel having a pulley structure, and the bevel wheel can support the mobile vehicle when the mobile vehicle is overturned; or according to the surrounding environment of the mobile vehicle, the pulley structure provides a center of gravity or a vertical height of a cabin by gears to amphibian operation.

9. The mobile vehicle mentioned in claim 1, further comprises a control unit disposed in the vehicle control unit, when the mobile vehicle turns, the weight distribution of the mobile vehicle is calculated by the control unit based on a spring coefficient of a shock absorber and a hardness control of the two driving wheels; when the mobile vehicle turns, a centripetal force and a reverse centripetal force are generated; and when a roll center of the centripetal force exceeds the relationship between the center of gravity of the two driving wheels and the mobile vehicle, the control unit performs a stability correction of the mobile vehicle.

10. The mobile vehicle mentioned in claim 1, further comprises a floor structure capable of lifting and pulling, controlled to rock by the suspension system, and used as an infinite walking platform for a game by an external shock absorber or a push rod.

* * * * *